Sept. 27, 1938.   E. C. BEHNKE   2,131,162
LINE SECURING DEVICE
Filed Oct. 3, 1936
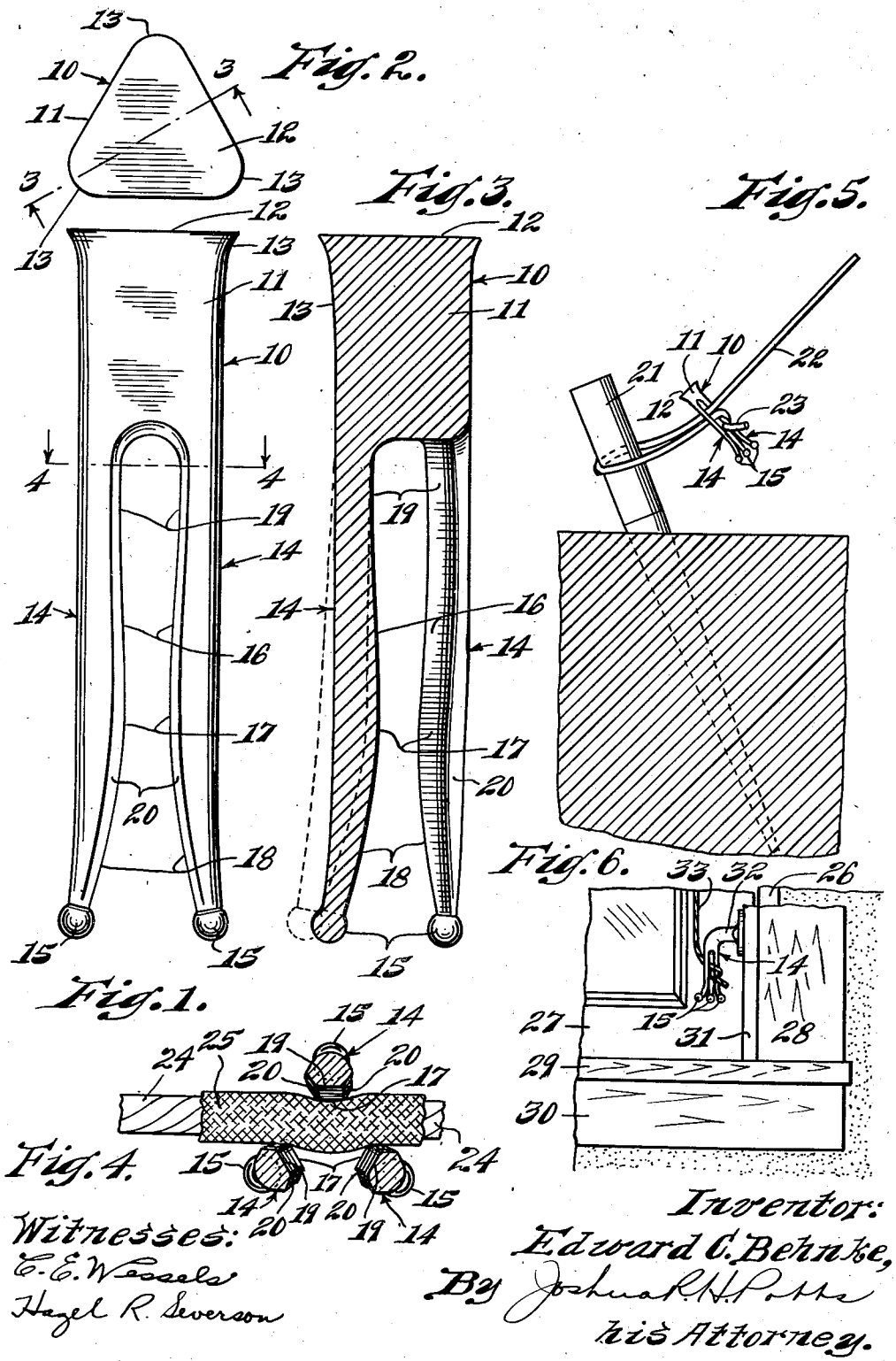
Witnesses:
E. E. Wessels
Hazel R. Severson
Inventor:
Edward C. Behnke,
By Joshua R. H. Potts
his Attorney.

Patented Sept. 27, 1938

2,131,162

UNITED STATES PATENT OFFICE 2,131,162

LINE SECURING DEVICE

Edward C. Behnke, Chicago, Ill.

Application October 3, 1936, Serial No. 103,822

4 Claims. (Cl. 24—129)

This invention relates to line securing devices and more especially to such devices of the clothespin type.

An object of the invention is to provide a line securing device as described which possesses novel features of construction and utility.

Another object is to provide a device of the character described having improved means for attachment to a line.

Another object is to provide a device of the character described in which the possibility of injuring a secured article such as a garment is a minimum.

Other objects and advantages will appear and be brought out more fully in the following specification, reference being had to the accompanying drawing, wherein:

Fig. 1 is a side view of an embodiment of my invention;

Fig. 2 is a top view of the same;

Fig. 3 is a sectional elevation taken along the line 3—3 of Fig. 2;

Fig. 4 is a cross-section taken along the line 4—4 of Fig. 1, illustrating one mode of attachment;

Fig. 5 is a view illustrating a variation in the utility of the device; and

Fig. 6 is a view illustrating a further variation in the utility of the device.

Referring more particularly to the drawing I show a line securing device or clothespin 10 having a head portion 11 and a substantially flat cap portion 12, the article preferably having a somewhat triangular shape, the edges 13 of which may be rounded or curved. The article is provided with three elongated legs 14, the extreme ends of which terminate in spherical or ball points 15, and have inner or contact surfaces 16 which are curved inwardly or convexed longitudinally as at 17 to provide restricted throat portions or openings thereat. The legs are provided with an outer flare 18 adjacent the outer ends thereof and an inner flare 19 adjacent the crotch, bight or head portion 11.

If desired the legs may be provided with side surfaces 20, which extend into the bight and each of which may be substantially parallel to the contact surface of one of the other legs 14. The foregoing construction is such that a line such as is illustrated in Fig. 4 may be secured between the legs of the device in such a manner that two of the surfaces 20 will bear against one side of the line, and the surface 16 will bear against the opposite sides of the line. That is, the inner faces 17—19 are flat and disposed perpendicular or normal to the radii of the pin bisecting said flat faces, and the flat faces 20 at each side in obtuse angled relation to the flat inner faces of corresponding legs. Thus, the nearest or innermost of the faces 20 of the legs opposite each flat face 17—19 are parallel to the latter faces, but so disposed as to cause a kink or bend in the line frictionally held therebetween, as shown in Fig. 4 of the drawing, so as to more effectively grip the line.

In Fig. 5 I show the device used in a somewhat different manner such as the securing of the end of a guy rope secured to a stake 21, the guy rope 22 being passed around the stake 21, the end 23 of the rope being twisted around one of the legs 14 and being clamped between it and the other two legs.

A clothesline 24 is shown in Fig. 4 and an article 25 secured thereto by the clothespin 10, it being clear from this figure that the line 24 is bent or crimped by the action of the pin when secured thereto. The resiliency of the legs 14 together with the mutually opposing curved surfaces 17 is such that when a pin is attached to a line the legs will spread a sufficient amount to securely clamp the line, and contact surfaces 16 will be substantially parallel as indicated by the dotted position of one of the legs 14 in Fig. 3. Thus the line may be secured at any point along the surfaces 16, 17, or 19 and there will be no likelihood of the pin splitting or the breaking off of one of the legs such as frequently occurs with the ordinary type of pin.

In Fig. 6 I show a modified form of my invention used to secure a curtain cord such as used for raising and securing Venetian blinds. A window frame 26 is shown having a lower sash 27, an inner side casing 28, stool 29, apron 30, and side stop 31. A line securing device 32 constructed according to my invention in the form of a bracket is secured to stop 31, and a shade cord 33 secured thereto by any of a variety of hitches in conjunction with the gripping action of the resilient legs 14.

It will be apparent that the device as described may in its usual form be constructed of wood. However, I do not wish to be limited to such material as it should be obvious that the pin may be constructed of other materials, for instance, Bakelite, wire, or otherwise.

While I have illustrated and described the preferred form of construction for carrying my invention into effect, this is capable of variation and modification without departing rom the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. A line securing device as described having a general triangular contour and a central bore and radial recesses merging therewith, whereby to define three legs, said legs each having its inner face flattened and the faces on each side thereof extending in obtuse angled relation also flattened, the inner flattened face of each leg being disposed substantially parallel to the last mentioned flat faces of the legs opposite thereto.

2. A clothespin comprising a body having a head portion and a central end bore and radial recesses merging therewith whereby to define three legs, the inner faces of each leg being flat and disposed normal to the radii of the pin bisecting said faces, and the legs on each side of said flat faces being beveled and flat so that said faces opposing each flat inner face are substantially parallel therewith to frictionally grip a line and cause a kink therein.

3. A clothespin comprising a body having a head portion and a central end bore and radial recesses merging therewith whereby to define three legs, the inner faces of each leg being flat and disposed normal to the radii of the pin bisecting said faces, and the legs on each side of said flat faces being beveled and flat so that said faces opposing each flat inner face are substantially parallel therewith and said radii to frictionally grip a line and cause a kink therein, said legs flaring in relation to one another at their inner portions, being convexed longitudinally at their intermediate portions to form restricted throat portions thereat and adapted to flex outwardly in substantially parallel relation and flaring outwardly toward their free ends.

4. A clothespin comprising a body having a head portion and a central end bore and radial recesses merging therewith whereby to define three legs, the inner faces of each leg being flat and disposed normal to the radii of the pin bisecting said faces, and the legs on each side of said flat faces being beveled and flat so that said faces opposing each flat inner face are substantially parallel therewith to frictionally grip a line and cause a kink therein, the inner faces of said legs being curved inwardly from near the bight portions and then curved outwardly toward their free ends, and enlarged ball terminals at said free ends.

EDWARD C. BEHNKE.